United States Patent
Jreij et al.

(10) Patent No.: US 11,036,863 B2
(45) Date of Patent: Jun. 15, 2021

(54) VALIDATING AN IMAGE USING AN EMBEDDED HASH IN AN INFORMATION HANDLING SYSTEM

(71) Applicant: DELL PRODUCTS, L.P., Round Rock, TX (US)

(72) Inventors: Elie A. Jreij, Pflugerville, TX (US); Eugene D. Cho, Austin, TX (US)

(73) Assignee: Dell Products, L.P., Round Rock, TX (US)

(*) Notice: Subject to any disclaimer, the term of this patent is extended or adjusted under 35 U.S.C. 154(b) by 414 days.

(21) Appl. No.: 15/666,222

(22) Filed: Aug. 1, 2017

(65) Prior Publication Data
US 2019/0042753 A1 Feb. 7, 2019

(51) Int. Cl.
| | |
|---|---|
| G06F 9/00 | (2006.01) |
| G06F 15/177 | (2006.01) |
| G06F 21/57 | (2013.01) |
| G06F 11/14 | (2006.01) |
| G06F 12/1018 | (2016.01) |
| G06F 9/4401 | (2018.01) |

(52) U.S. Cl.
CPC ........ *G06F 21/575* (2013.01); *G06F 11/1417* (2013.01); *G06F 12/1018* (2013.01); *G06F 9/4401* (2013.01); *G06F 11/1482* (2013.01)

(58) Field of Classification Search
CPC .................................................. G06F 21/575
See application file for complete search history.

(56) References Cited

U.S. PATENT DOCUMENTS

| | | |
|---|---|---|
| 9,122,876 B2 | 9/2015 | Batke et al. |
| 2004/0221014 A1 | 11/2004 | Tomkow |
| 2007/0156638 A1 | 7/2007 | Vadekar et al. |
| 2008/0267406 A1* | 10/2008 | Asokan ............... H04L 63/168 380/277 |
| 2008/0301815 A1* | 12/2008 | Lauter .................. G03G 21/04 726/26 |
| 2009/0094673 A1* | 4/2009 | Seguin ................... G06F 21/51 726/1 |
| 2011/0087872 A1* | 4/2011 | Shah ..................... G06F 21/554 713/2 |
| 2012/0179676 A1* | 7/2012 | Park .................... G06F 16/5866 707/736 |
| 2015/0019872 A1 | 1/2015 | Asokan et al. |
| 2018/0075241 A1* | 3/2018 | Gomez .................. G06F 8/654 |

FOREIGN PATENT DOCUMENTS

WO    2000018162 A1    3/2000

* cited by examiner

*Primary Examiner* — Mohammed H Rehman
(74) *Attorney, Agent, or Firm* — Isidore PLLC (57) ABSTRACT

A method, an information handling system (IHS) and a validation system for validating an image using an embedded hash. The method includes retrieving, via a controller, a first image from a first memory device and extracting a first hash from a first location within the first image. The first hash was previously generated using an original set of data that includes a first data string, and the first image includes the first hash inserted into the first location to replace the first data string. The method includes retrieving a copy of the first data string. The method further includes generating a second image by inserting the first data string into the first location from which the first hash was extracted such that the second image contains the original set of data. The method further includes validating the first image using the first hash and the second image.

20 Claims, 6 Drawing Sheets

VALIDATING AN IMAGE USING AN EMBEDDED HASH IN AN INFORMATION HANDLING SYSTEM

BACKGROUND

1. Technical Field

The present disclosure generally relates to information handling systems and in particular to security of firmware images in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

Information handling systems can utilize stored firmware or images to manage initialization and configuration of devices, booting of platform resources, and passing of control to a control system or operating system. A signature can be appended to a firmware image for security purposes. During a firmware update process on an information handling system, an update utility, verifies that the signature of the firmware image is correct before storing the firmware image. The signature is not stored after verification is complete, and is discarded. On subsequent reboots, the firmware image is run without verification. Unfortunately, if the firmware image is the target of a malicious attack or tampering, the attack or tampering may not be detected and the resulting corrupted, maliciously modified, or otherwise unauthorized firmware is run during the subsequent reboot of the system. Changing this behavior on shipping products cannot be done seamlessly since existing update utilities strip the signature.

BRIEF SUMMARY

Disclosed are a method, an information handling system (IHS), and a validation system for validating an image using an embedded hash.

According to one embodiment, the method includes retrieving, via a controller, a first image from a first memory device and extracting a first hash from a first location within the first image. The first hash was previously generated using an original set of data that includes a first data string, and the first image includes the first hash inserted into the first location to replace the first data string. The method includes retrieving a copy of the first data string. The method further includes generating a second image by inserting the first data string into the first location from which the first hash was extracted such that the second image contains the original set of data. The method further includes validating the first image using the first hash and the second image.

According to another embodiment, the IHS includes a controller communicatively coupled to a first memory device. The controller has firmware executing thereon for validating an image using an embedded hash. The firmware configures the controller to retrieve a first image from a first memory device and extract a first hash from a first location within the first image. The first hash was previously generated using an original set of data that includes a first data string, and the first image includes the first hash inserted into the first location to replace the first data string. The controller retrieves a copy of the first data string. The firmware further configures the controller to generate a second image by inserting the first data string into the first location from which the first hash was extracted such that the second image contains the original set of data. The firmware further configures the controller to validate the first image using the first hash and the second image.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, an information handling system (IHS), and a validation system for validating an image using an embedded hash.

The method includes retrieving, via a controller, a first image from a first memory device and extracting a first hash from a first location within the first image. The first hash was previously generated during an image generation/provisioning process using an original set of data that includes a first data string. The first image includes the first hash inserted into the first location to replace the first data string. The method includes retrieving a copy of the first data string. The first data string is part of the original set of data used to generate the first hash. The method further includes generating a second image by inserting the first data string into the first location from which the first hash was extracted such that the second image contains the original set of data. The method further includes validating the first image using the first hash and the second image. According to one aspect, the method allows the image signature to be maintained without modifying the update utility.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
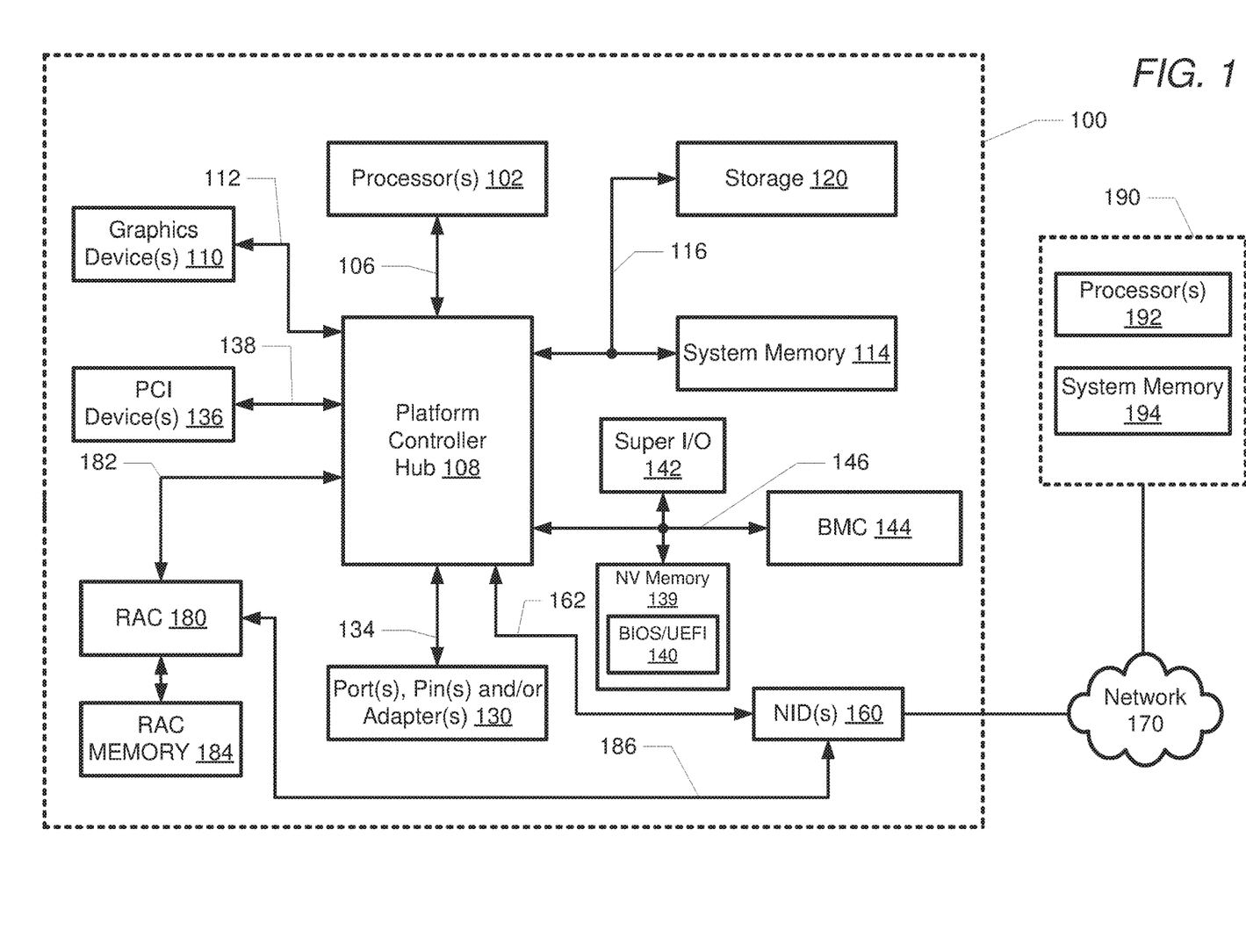
FIG. 1 illustrates one example of an IHS within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, an example of an IHS 100 and a factory IHS 180 is shown. IHS 100 includes one or more processor(s) 102. In various embodiments, IHS 100 may be a single-processor system including one processor 102, or a multi-processor system including two or more processor(s) 102 (e.g., two, four, eight, or any other suitable number). Processor(s) 102 includes any processor capable of executing program instructions.

Processor(s) 102 are coupled to platform controller hub (PCH) or chipset 108 via front-side bus 106. PCH 108 may be configured to coordinate I/O traffic between processor(s) 102 and other components. For example, in this particular implementation, PCH 108 is coupled to various IHS components such as graphics device(s) 110 (e.g., one or more video cards or adaptors, etc.) via graphics bus 112 (e.g., an Accelerated Graphics Port or AGP bus, a Peripheral Component Interconnect (PCI) bus, etc.). PCH 108 is also coupled to system memory 114 via system bus 116. System memory 114 may be configured to store program instructions and/or data, accessible by processor(s) 102. In various embodiments, system memory 114 may be implemented using any suitable memory technology, such as static RAM (SRAM), synchronous dynamic RAM (SDRAM), nonvolatile/Flash-type memory, or any other type of memory.

PCH 108 is coupled by system bus 116 to storage device or storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 114 during operation of IHS 100.

PCH 108 is also coupled to one or more PCI devices 136 (e.g., modems, network cards, sound cards, video cards, shared memory etc.) via PCI bus 138. PCH 108 is further coupled to port(s), pin(s), and/or adapter(s) 130 over bus 134. Generally, PCH 108 may be configured to handle various I/O operations, and PCH 108 may provide interfaces such as, for instance, Universal Serial Bus (USB), audio, serial, parallel, Ethernet, and other interfaces, via port(s), pin(s), and/or adapter(s) 130 over bus 134. For example, PCH 108 may be configured to allow data to be exchanged between IHS 100 and other devices, such as other IHSs attached to a network. In various embodiments, PCH 108 may support communication via wired or wireless general data networks, such as any suitable type of Ethernet network, via telecommunications/telephony networks, such as analog voice networks or digital fiber communications networks, via storage area networks (SAN) such as Fiber Channel SANs, or via any other suitable type of network and/or protocol.

PCH 108 may also enable connection to one or more input devices, such as keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. PCH 108 is coupled to a non-volatile (NV) storage or memory device 139 via Low Pin Count (LPC) bus 146. NV memory 139 stores a basic input output system/unified extensible firmware interface (BIOS/UEFI) 140. PCH 108 is also coupled to super I/O Controller 142 and baseboard management controller (BMC) 144 via LPC bus 146.

BIOS/UEFI 140 includes program instructions stored thereon typically as BIOS or UEFI images. Those instructions may be usable by processor(s) 102 to initialize and test other hardware components and/or to load an Operating System (OS) onto IHS 100. As such, (BIOS/UEFI) 140 may include a firmware interface that allows processor(s) 102 to load and execute certain firmware, as described in more detail below. In some cases, such firmware may include program code that is compatible with the Unified Extensible Firmware Interface (UEFI) specification, although other types of firmware may be used.

IHS 100 further includes a board management controller (BMC) 144 that is in communication with NV memory 139 that can have program instructions stored thereon that are usable by processors(s) 102 to enable remote management of IHS 100. For example, BMC 144 may enable a user to discover, configure, and manage BMC 144, setup configuration options, resolve and administer hardware or software problems, etc. Additionally or alternatively, BMC 144 may include one or more BMC firmware volumes, each volume having one or more firmware files used by the UEFI firmware interface to initialize and test components of IHS 100. IHS 100 also includes a super I/O controller 142 that combines interfaces for a variety of lower bandwidth or low data rate devices. Those devices may include, for example, floppy disks, parallel ports, a keyboard and mouse and other devices.

In some cases, IHS 100 may be configured to access different types of computer-accessible media separate from system memory 114. Generally speaking, a computer-accessible storage or memory device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 108. Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

IHS 100 further includes one or more network interface devices (NID(s)) 160 coupled to PCH 108 via PCI bus 162. NID(s) 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

IHS 100 further includes a remote access controller (RAC) 180 coupled via a PCI bus 182 to PCH 108. In other embodiments, RAC 180 and BMC 144 are integrated into a single device that provides the functionality of both devices. The presentation of these devices as separate components within IHS 100 is thus not intended to be limiting on the disclosure and enables better clarity in describing the different features and functionality performed by each device. RAC 180 provides management functions that allow an administrator to deploy, monitor, manage, configure, update, troubleshoot and remediate IHS 100. RAC 180 is also coupled to a RAC memory device 184. In one embodiment, RAC memory 184 can be shared with processor(s) 102. RAC memory device 184 can be an NV memory device. RAC 180 is also communicatively coupled to NID(s) 160 via a sideband bus 186.

RAC 180 monitors and controls the operation of IHS 100 and other systems and devices communicatively coupled to IHS 100. RAC 180 can also perform configuration and remote control of other connected IHSs. Certain software and/or firmware modules stored in RAC memory 184 can be executed by RAC 180. Processor(s) 102 and RAC 180 include specific firmware that enables processor(s) 102 and RAC 180 to perform the various functions described herein.

Factory IHS 190 includes one or more processor(s) 192 and system memory 194. Factory IHS 190 can generally have the same components and architecture as IHS 100. Factory IHS 190 is communicatively coupled to IHS 100 via network 170.

A person of ordinary skill in the art will appreciate that IHS 100 and factory IHS 180 are merely illustrative and are not intended to limit the scope of the disclosure described herein. In particular, any computer system and/or device may include any combination of hardware or software capable of performing certain operations described herein. For instance, although IHS 100 is illustrated following a first type architecture, various systems and methods described herein may be adapted to work with any other architecture having a different chipset and/or RAC configuration. In other implementations, one or more of the devices or components shown in FIG. 1 may be absent, or one or more other components may be added. Accordingly, systems and methods described herein may be implemented or executed with other computer system configurations. In addition, the operations performed by the illustrated components may, in some embodiments, be performed by fewer components or distributed across additional components. Similarly, in other embodiments, the operations of some of the illustrated components may not be performed and/or other additional operations may be available.

Figure 2A:
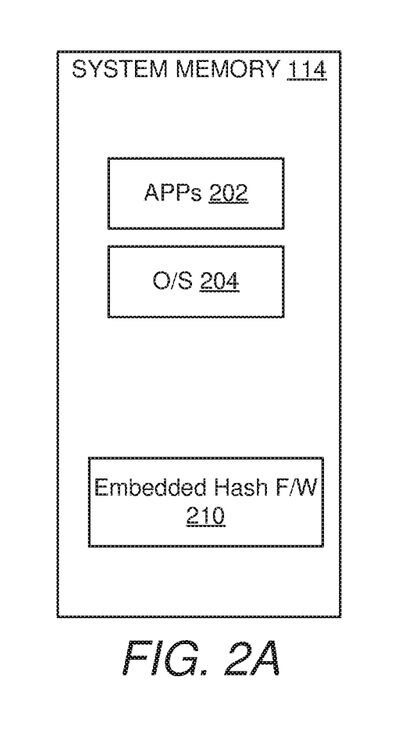
FIG. 2A illustrates example contents of a system memory in an IHS, in accordance with one embodiment.

With reference now to FIG. 2A, one embodiment of example contents of system memory 114 of IHS 100 is shown. In the description of FIG. 2A and each of the following figures, reference is also made to specific components illustrated within the preceding figures. System memory 114 includes data, software, and/or firmware modules, including application(s) 202 and operating system (O/S) 204. System memory 114 can also include other data, software, and/or firmware modules. System memory 114 includes embedded hash F/W 210. In one embodiment, system memory 184 (FIG. 1) can also store embedded hash F/W 210. Embedded hash F/W 210 allows a hash to be embedded into an image in factory IHS 180. In one embodiment, embedded hash F/W 210 performs the processes presented in the flowchart of FIG. 4.

Figure 2B:
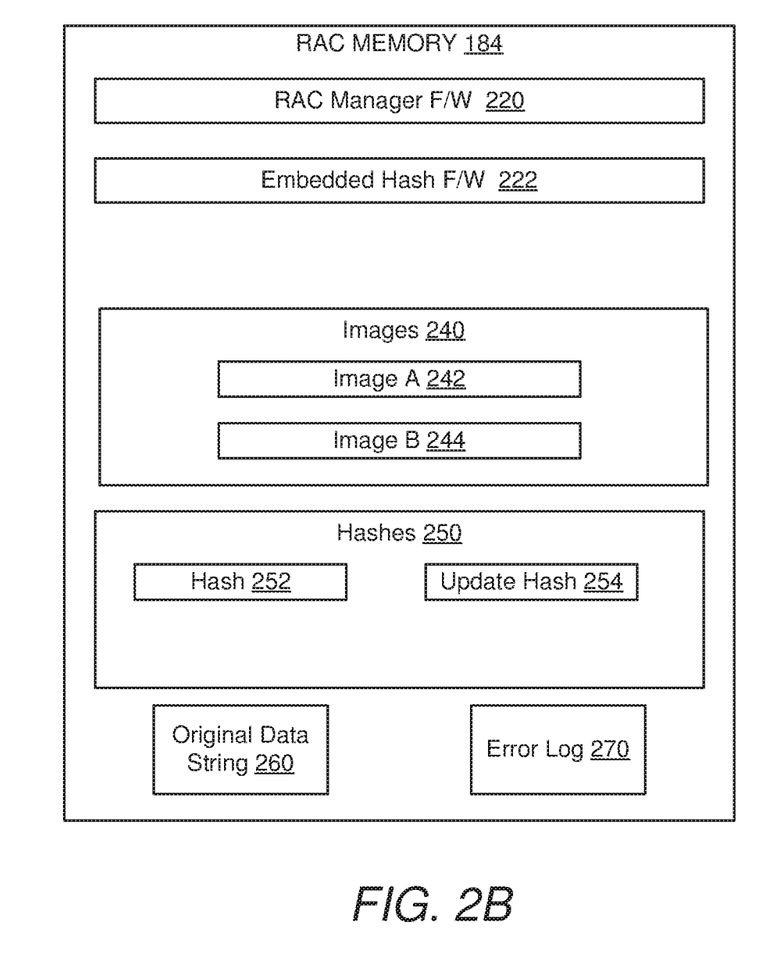
FIG. 2B illustrates example contents of a remote access controller memory device, in accordance with one embodiment.

Turning to FIG. 2B, one embodiment of example contents of RAC memory 184 of IHS 100 is shown. RAC memory 184 includes RAC manager firmware (F/W) 220 and embedded hash F/W 222. RAC manager F/W 220 allows an administrator to deploy, monitor, manage, configure, update, troubleshoot and remediate IHS 100. Embedded hash F/W 222 allows a hash to be extracted from an image and for validating an image using an embedded hash. In one embodiment, embedded hash F/W 222 performs one or more of the processes presented in the flowcharts of FIGS. 5 and 6. It is appreciated that one or more of the described processes can be performed by another processing component (e.g., processors (102)) executing different image generation or image validation program modules/code within an information handling system. It is further appreciated that the provisioning step for generating the original (first) images can be performed in a separate IHS, executing different image generation program modules/code, from the IHS that performs the downstream image validation processes. Further, while certain of the processes may be described using a specific image, the functionality described applies to all images that can be tampered with and may require pre-boot validation for image authenticity.

RAC memory 184 further includes files, drivers or images 240. Images 240 are used to initialize or boot and/or to load an operating system (OS) onto RAC 180. Images 240 include image A 242 and image B 244. RAC memory 184 further includes hashes 250. Hashes 250 are unique values generated by a hash function. Hashes can be used to uniquely identify information and data. In one embodiment, the hash function can be a secure hash function or secure hash algorithm (SHA) such as the SHA-2 hash function. According to one aspect of the disclosure, hashes are extracted from images and then stored for later use. Hashes 250 include hash A 252 and update hash 254. Hash A 252 corresponds to a hash of image A 242. Update hash 254 is a pre-determined hash that is sent to IHS 100 as part of a provisioning process and stored and later used to validate or authenticate new images that are received.

RAC memory 184 further includes original/first data string 260 and error log 270. Original/first data string 260 is a string/sequence of pre-determined data (e.g., a string of bytes of data from a specific address location), which was initially included within a complete set/sequence of image data used, during the provisioning process, to generate the embedded hash. Following the generation of the embedded hash, the first data string 260 is removed from within the complete set of image data and replaced by the embedded hash to generate the first image. First data string 260 is a specific sequence of data strings that is known to the manufacturer and/or identified during provisioning or updating of the device images. According to one embodiment, first data string 260 is provided to (i.e., stored in non-volatile memory of) each downstream IHS that will receive a copy of the first image. For example, first data string 260 can be a known quantity programmed into each RAC along with the specific address location of the embedded hash. In yet another embodiment, first data string 260 and its location can be values stored in the cloud and downloadable by the RAC for use during pre-boot validation of images on the IHS.

During verification of the device images on the IHS, the first data string is inserted in place of an embedded hash to re-create the original image. Error log 270 contains error messages generated by RAC 180 when problems or errors occur during initializing or booting of RAC 180.

Figures 3A, 3B, 3C:
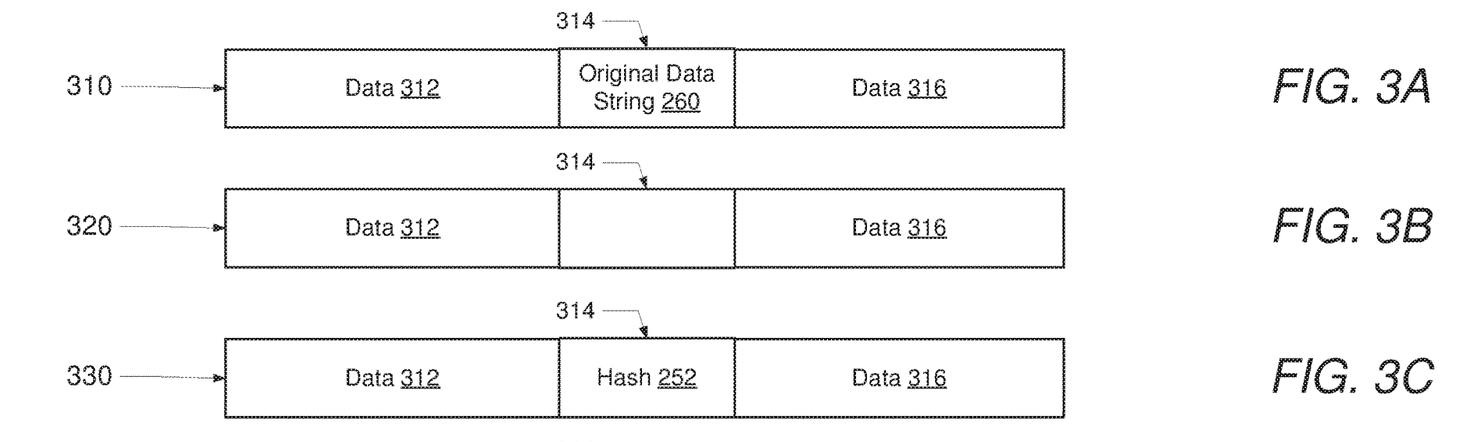
FIG. 3A illustrates one example of an original image with reserved address location, in accordance with one embodiment.
FIG. 3B illustrates one example of an intermediate image with the original data string removed from the reserved address location, in accordance with one embodiment.
FIG. 3C illustrates one example of a first image with an embedded hash inserted into the reserved address location, in accordance with one embodiment.

FIG. 3A illustrates an original image 310 that includes a reserved address location 314 containing the original data string 260. Original image 310 further includes image data 312 and image data 316. Data 312, reserved address location 314 and data 316 are a sequence of bytes within a longer string of bytes that make up original image 310. According to one aspect of the disclosure, a hash (e.g. hash A 252) can be calculated using original image 310. The original data string is part of the original set of data used to generate the hash. Turning to FIG. 3B, intermediate image 320 is shown. Image 320 has had the original string data 260 removed from the reserved address location 314.

FIG. 3C illustrates another intermediate image 330 that contains an embedded hash A 252 inserted into reserve address location 314. Image 330 further includes image data 312 and image data 316. According to one aspect of the disclosure, embedded hash A 252 is calculated using original image 310 and inserted into reserved address location 314 to replace the original data string 260.

Figure 3D:
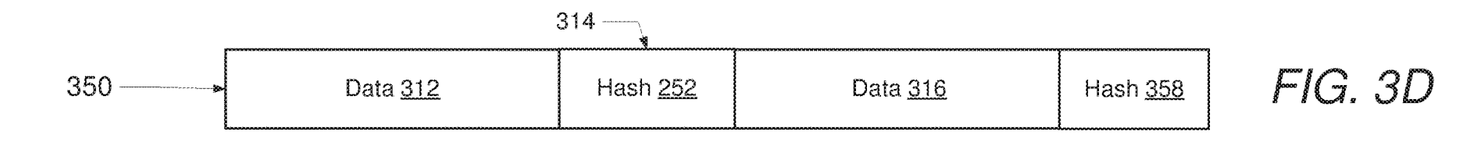
FIG. 3D illustrates one example of a new image with an appended hash, in accordance with one embodiment.

FIG. 3D illustrates a new image 350 that contains both an embedded hash A 252 and an appended hash 358. New image 350 further includes data 312 and data 316. Appended hash 358 is calculated and appended to intermediate image 330 to form new image 350. According to an additional aspect of the disclosure, when RAC 180 receives new image 350, RAC 180 retrieves update hash 254 and appended hash 358. RAC 180 compares update hash 254 and appended hash 358. If update hash 254 and appended hash 358 do not match, an error message is generated and stored to error log 270. If update hash 254 and the appended hash 358 match, appended hash 358 is removed or discarded and the remaining image (i.e. image 330 containing data 312, 316 and embedded hash A 252) is stored to RAC memory 184.

Figures 3E, 3F:
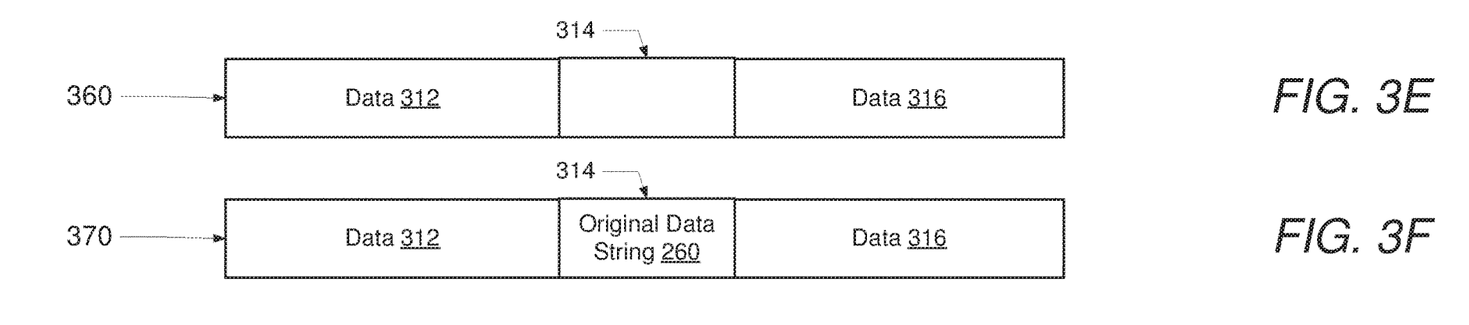
FIG. 3E illustrates one example of an intermediate image with the embedded hash removed from the reserved address location, in accordance with one embodiment.
FIG. 3F illustrates one example of a second image with the original data string inserted into the reserved address location to generate a comparative hash for verifying the image, in accordance with one embodiment

Turning to FIG. 3E, according to another aspect of the disclosure, embedded hash A 252 is removed from image 330 to generate second intermediate image 360. The embedded hash A 252 can be stored to RAC memory 184. Image 360 further includes data 312 and data 316.

As shown in FIG. 3F, original data string 260 is inserted in the location 314 of the removed embedded hash to create or generate a subsequent or second image 370. Assuming no tampering has occurred prior to this step of the process, second image 370 is an identical copy or duplicate of the original image 310. Second image 370 thus contains the original set of image data. Second image 370 can be stored to RAC memory 184 for later use during subsequent boot up of the device. Thus, second image 370 is generated by inserting the original data string 260 into the reserved address location 314 from which the embedded hash A 252 was extracted such that the second image 370 contains the original set of data.

In one embodiment, embedded hash F/W 222, executing on RAC 180, retrieves a first image (e.g. image A 242) from RAC memory 184 and extracts a first hash (e.g. hash A 252) from a first location (e.g. location 314) within the first image. The first hash was previously generated using an original set of data that includes a first data string (e.g. original data string 260), and the first image includes the first hash inserted into the first location to replace the first data string. The method includes retrieving a copy of the first data string (e.g. original data string 260). The method further includes generating a second image (e.g. image B 244) by inserting the first data string (e.g. original data string 260) into the first location (e.g. location 314) from which the first hash was extracted such that the second image (e.g. image B 244) contains the original set of data. The method further includes validating the first image using the first hash and the second image. The extracted embedded (first) hash allows for subsequent verification of the first image at a later time during operation of IHS 100.

Figure 4:
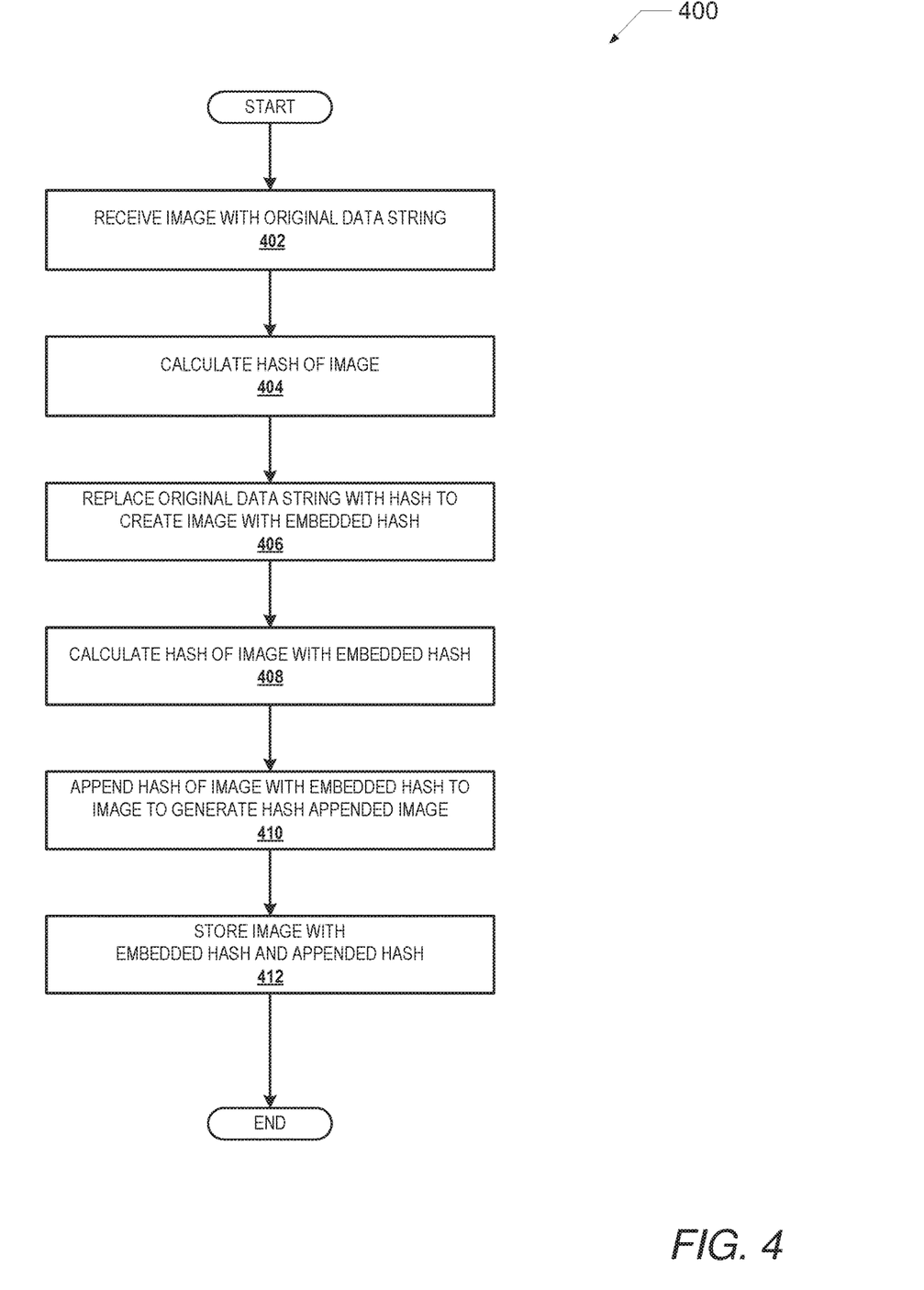
FIG. 4 is a flow chart illustrating one example of a method for embedding a hash into a device image, according to one or more embodiments.
Figure 5:
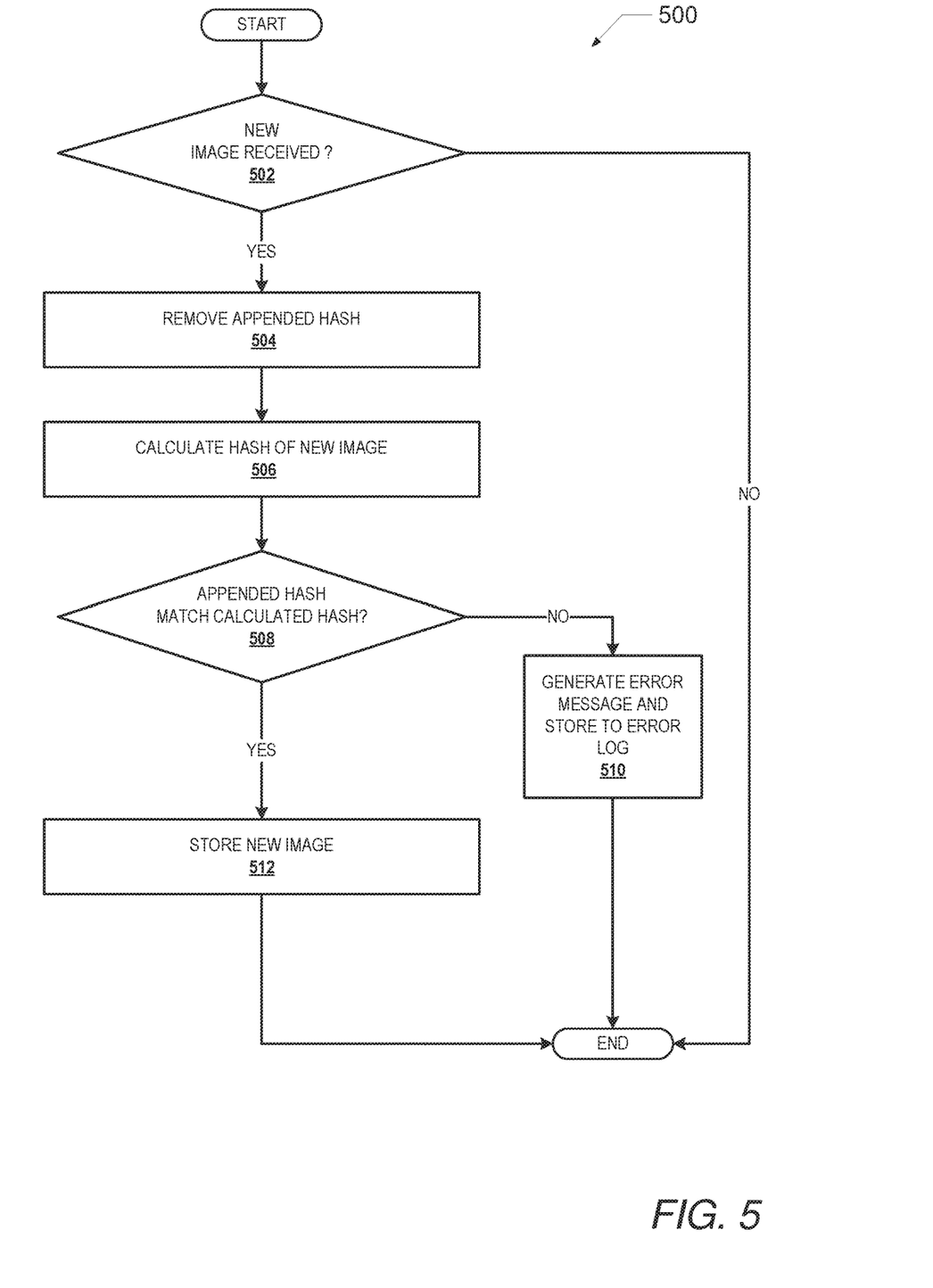
FIG. 5 is a flow chart illustrating one example of a method for updating an IHS with a new device image, according to one or more embodiments.
Figure 6:
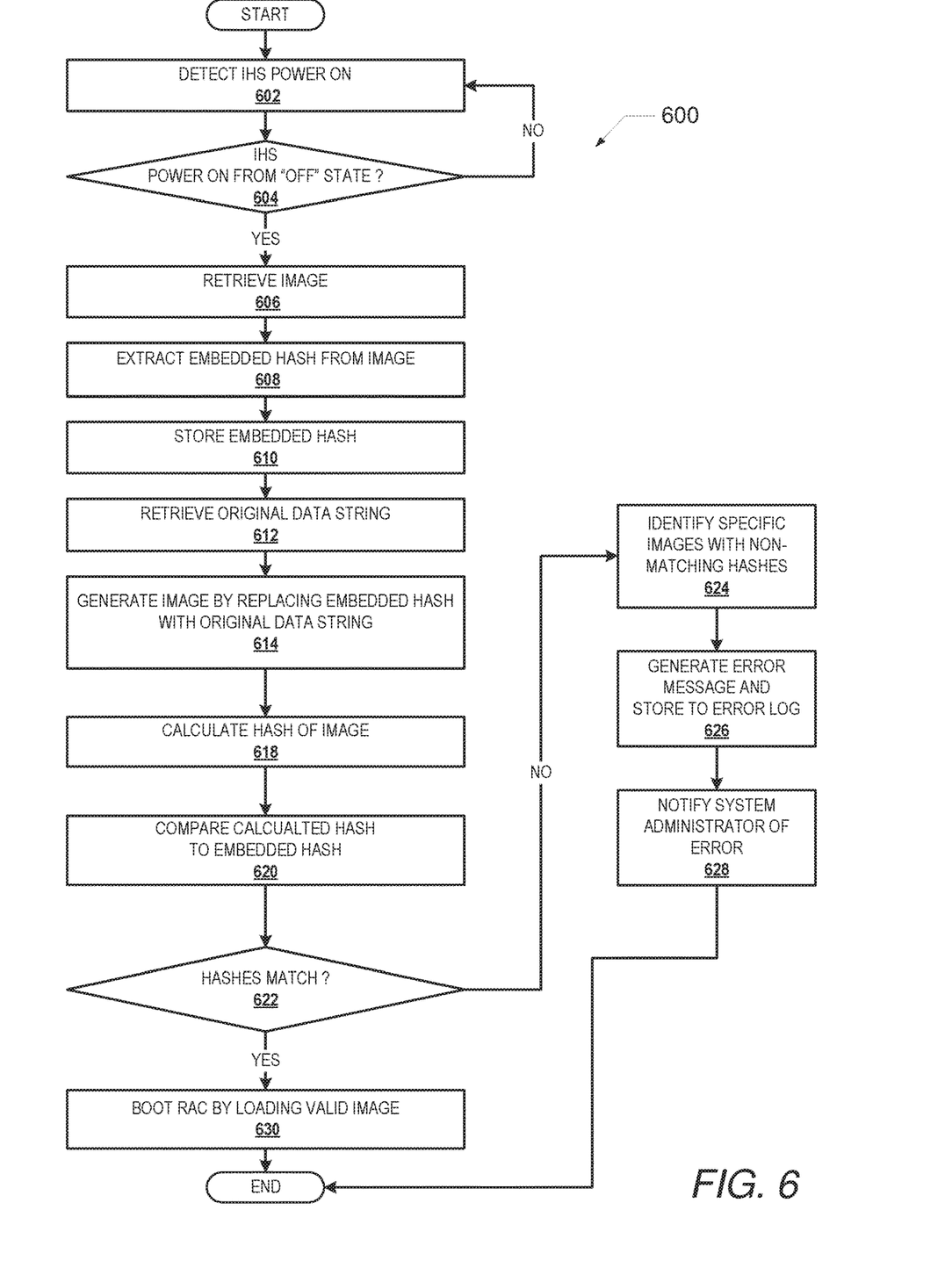
FIG. 6 is a flow chart illustrating one example of a method for validating a device image using an embedded hash, according to one or more embodiments.

FIGS. 4, 5 and 6 illustrate flowcharts of exemplary methods 400, 500 and 600 by which processor 192 and RAC 180 within the preceding figures performs different aspects of the processes that enable the one or more embodiments of the disclosure. Generally, method 400 represents a method for embedding a hash into an image. Method 500 represents a method for updating an IHS with a new image. Method 600 represents a method for validating a device image using an embedded hash.

The description of methods 400, 500 and 600 is provided with general reference to the specific components illustrated within the preceding FIGS. 1-3B. Generally, method 400 is performed by factory IHS 190 during the generation of new images which can then be transmitted from the factory IHS to a customer IHS (e.g. IHS 100). Method 400 is described as being implemented via processor(s) 192 and particularly the execution of code provided by embedded hash F/W 210 within processor(s) 192. In the presented descriptions, method 400 is not being performed on the same IHS as methods 500 and 600. Methods 500 and 600 are described as being implemented via RAC 180 and particularly the execution of code provided by embedded hash F/W 222 acting within RAC 180. It is however appreciated that certain aspects of the described methods may be implemented via other processing devices and/or execution of other code.

Referring to the flow chart of FIG. 4, method 400 begins at the start block and proceeds to block 402 where processor (s) 192 within factory IHS 190 receives one or more images (i.e. fourth image) (e.g. image 310) with original data string 260 in the reserved address location 314 during a manufacturing or update process by an image manufacturer or vendor. Processor(s) 192 calculates a hash (i.e. third hash) (e.g. hash A 252) of the third image (e.g. image 310) (block 404). In another embodiment, processor(s) 192 can insert the original data string 260 into reserved address space 314, and then calculate a hash.

Processor(s) 192 replaces the original data string 260 in the reserved address space with the calculated hash A 252 (block 406). At block 408, processor 192 calculates an appended hash (e.g. appended hash 358) of the resulting image (i.e. fourth image) (e.g. image 330) with the embedded hash. Processor(s) 192 appends the appended hash 358 to the fourth image to generate a hash-appended image (i.e. modified fourth image) with both an embedded hash and an appended hash (e.g., image 350) (block 410). Processor(s) 192 stores image 350 to system memory 194 (block 412). Image 350 can then be provided as a new image to separate downstream IHSs, such as a customer IHS (i.e. IHS 100), via downstream provisioning means known to those skilled in the art. Method 400 then ends.

FIG. 5 illustrates a method for updating IHS 100 with a new image. Method 500 begins at the start block and proceeds to decision block 502 where RAC 180 determines if a new image (e.g. image 350) has been received. In one embodiment, a system user or administrator can provide user input to elect to update the current images with new images. In response to no new image being received, method 500 concludes at the end block. In response to at least one new image being received, RAC 180 removes appended hash 358 from the image (block 504). RAC 180 calculates a hash (i.e. fourth hash) of the image (e.g. image 350) (block 506).

RAC 180 determines if the calculated hash matches the appended hash 358 (decision block 508). The purpose of the hash comparison is to identify if the new image is valid or has been modified or tampered with. In response to the hashes not matching, RAC 180 generates a first type error message and stores the first type error message to error log 270 (block 510). The first type error message includes the identity of the new image that has failed authentication. The first type error message also includes the reason for failing validation which is because the appended hash was not authenticated. When the image fails authentication, the image is not loaded and the device (e.g. RAC 180) does not boot. In one embodiment, RAC 180 can prevent the new image from being loaded if the image fails authentication. Method 500 then terminates. In response to the hashes matching, RAC 180 and stores the remaining new image (i.e. third image) (e.g. image 330 containing data 312, 316 and hash 252) to RAC memory 184 (block 512). Method 500 then concludes at the end block.

FIG. 6 illustrates a method for validating an existing device image using an embedded hash. Method 600 begins at the start block and proceeds to block 602 where RAC 180 detects that IHS 100 has been powered on such that the RAC and other functional components receive a full complement of power required to operate. The powering on of the IHS to an operational state can occur from one of at least two possible non-operational states. In at least one embodiment, the IHS 100 can be booted up entirely from an off state, in which a start-up and validation or authentication protocol is required to load firmware to the RAC before the IHS can function. Alternatively, the IHS 100 can be activated from a low power state, such as a sleep or hibernation state, in which the previously authenticated RAC firmware is re-activated without requiring another authentication process.

At decision block 604, RAC 180 determines if the powering on of IHS 100 involved powering on (i.e., providing system power to the components of IHS 100) from an off state. In response to IHS 100 not being powered on from an off state (i.e., power on from a low power state), method 600 returns to block 602 to continue detecting a power on condition that occurs from an off state of IHS 100.

In response to IHS 100 being powered on from an off state, RAC 180 retrieves at least one device image or first image (e.g. image A 242) from RAC memory 184 (block 606). RAC 180 extracts or retrieves the data at the address location 314 (e.g. a first embedded hash A 252) from within image A 242 (block 608) and stores the data at the address location 314 (e.g. hash A 252) to RAC memory 184 (block 610). RAC 180 retrieves the original data string 260 from RAC memory 184 (block 612). RAC 180 generates a second image (e.g. image 370) by inserting the original data string 260 in place of the embedded hash A 252 (block 614) and calculates a second hash of the second image (e.g. image 370) (block 618). RAC 180 compares the embedded hash A 252 to the second calculated hash of the second image 370 (block 620). The purpose of the hash comparison is to identify if the current image (i.e. image A 242) is valid or if the current image has been tampered with.

RAC 180 determines if the data at the address location 314 (e.g. embedded hash A 252) matches the second calculated hash (decision block 622). In response to the hashes not matching, RAC 180 identifies the specific image (i.e. image A 242) that has failed validation (block 624). RAC 180 generates a second type error message and stores the second type error message to error log 270 (block 626). The second type error message includes the identity of the image that has failed validation. The second type error message also includes the reason for failing validation which is because the embedded hash was not authenticated. RAC 180 sends a notice to a system administrator that an image validation error has occurred (block 628). In one embodiment, the specific image that has been tampered with is identified within the notice. Alternatively, or in conjunction, the administrator may receive a general error notification and determine the specifics of the error by assessing the stored error log. The error log can contain one or more of the first or second type error messages. In one embodiment, the device may be prevented from booting or not be allowed to boot due to failure of the image authentication. Method 600 then ends.

In response to the hashes matching at decision block 622, RAC 180 initializes or boots by loading one or more valid images (i.e. image A 242) (block 630). Method 600 then concludes at the end block.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for validating an image within an information handling system, the method comprising:
    retrieving, via a controller, a first image from a first memory device, the first image including a first hash in a first reserved address location, the first hash being previously calculated using an original set of data that included a first data string in the first reserve address location, wherein the first image is generated by inserting the calculated first hash into the first reserve address location;
    extracting the first hash from the first reserve address location within the first image;
    retrieving, from a remote access controller (RAC) memory, a stored copy of the first data string;
    generating a second image by inserting the copy of the first data string into the first reserve address location from which the first hash was extracted such that the second image contains the original set of data; and
    validating the first image using the first hash and the second image.

2. The method of claim 1, wherein validating the first image comprises:
    calculating a second hash of the second image;
    determining if the first hash and the second hash match; and
    in response to the first hash and the second hash not matching:
        generating a first type error message that indicates detection of tampering with the first image; and
        storing the first type error message to an error log that contains error messages generated by a controller when problems or errors occur during initializing or booting of the controller.

3. The method of claim 2, further comprising:
    in response to the first hash and the second hash matching, identifying the first image as a valid image and loading the first image during a subsequent reboot of the information handling system as a valid image.

4. The method of claim 2, further comprising:
    notifying a system administrator that tampering of the first image has been detected and preventing boot up using the first image.

5. The method of claim 1, further comprising:
    determining if a new image has been received;
    in response to the new image being received, removing an appended hash from the new image;
    calculating a fourth hash of the new image; determining if the fourth hash and the appended hash match; and
    in response to the fourth hash and the appended hash not matching:
        generating a second type error message that indicates detection of tampering with the new image; and
        storing the second type error message to an error log.

6. The method of claim 5, further comprising:
    in response to the fourth hash and the appended hash matching:
        storing the remaining new image to the first memory device.

7. An information handling system (IHS) comprising:
    a controller communicatively coupled to a first memory device, the controller having firmware executing thereon for validating an image using an embedded hash, wherein the firmware configures the controller to:
        retrieve a first image from a first memory device, the first image including a first hash in a first reserved address location, the first hash being previously calculated using an original set of data that included a first data string in the first reserve address location, wherein the first image is generated by inserting the calculated first hash into the first reserve address location;
        extract the first hash from the first reserve address location within the first image;
        retrieve, from a remote access controller (RAC) memory, a stored copy of the first data string;
        generate a second image by inserting the copy of the first data string into the first reserve address location from which the first hash was extracted such that the second image contains the original set of data; and
        validate the first image using the first hash and the second image.

8. The information handling system of claim 7, wherein validating the first image comprises the firmware further configuring the controller to:
    calculate a second hash of the second image;
    determine if the first hash and the second hash match; and in response to the first hash and the second hash not matching:
  generate a first type error message that indicates detection of tampering with the first image; and
  store the first type error message to an error log that contains error messages generated by a controller when problems or errors occur during initializing or booting of the controller.

9. The information handling system of claim 8, wherein the firmware further configures the controller to:
in response to the first hash and the second hash matching, identify the first image as a valid image and load the first image during a subsequent reboot of the IHS as a valid image.

10. The information handling system of claim 8, wherein the firmware further configures the controller to:
notify a system administrator that tampering of the first image has been detected and preventing boot up using the first image.

11. The information handling system of claim 7, wherein the firmware further configures the controller to:
determine if a new image has been received;
in response to the new image being received,
remove an appended hash from the new image;
calculate a fourth hash of the new image;
determine if the fourth hash and the appended hash match; and
in response to the fourth hash and the appended hash not matching:
  generate a second type error message that indicates detection of tampering with the new image; and
  store the second type error message to an error log.

12. The information handling system of claim 11, wherein the firmware further configures the controller to:
in response to the update hash and the appended hash matching:
  store the remaining new image to the first memory device.

13. A validation system comprising:
a controller communicatively coupled to a first memory device, the controller having firmware executing thereon for validating an image using an embedded hash, wherein the firmware configures the controller to:
  retrieve a first image from a first memory device, the first image including a first hash in a first reserved address location, the first hash being previously calculated using an original set of data that included a first data string in the first reserve address location, wherein the first image is generated by inserting the calculated first hash into the first reserve address location;
  extract the first hash from the first reserve address location within the first image;
  retrieve, from a remote access controller (RAC) memory, a stored copy of the first data string;
  generate a second image by inserting the copy of the first data string into the first reserve address location from which the first hash was extracted such that the second image contains the original set of data; and
  validate the first image using the first hash and the second image.

14. The validation system of claim 13, wherein validating the first image comprises the firmware further configuring the controller to:
  calculate a second hash of the second image;
  determine if the first hash and the second hash match; and
  in response to the first hash and the second hash not matching:
    generate a first type error message that indicates detection of tampering with the first image; and
    store the first type error message to an error log that contains error messages generated by a controller when problems or errors occur during initializing or booting of the controller.

15. The validation system of claim 14, wherein the firmware further configures the controller to:
in response to the first hash and the second hash matching, identify the first image as a valid image and load the first image during a subsequent reboot of the IHS as a valid image.

16. The validation system of claim 14, wherein the firmware further configures the controller to:
notify a system administrator that tampering of the first image has been detected and preventing boot up using the first image.

17. The validation system of claim 13, wherein the firmware further configures the controller to:
determine if a new image has been received;
in response to the new image being received, remove an appended hash from the new image;
calculate a fourth hash of the new image;
determine if the fourth hash and the appended hash match; and
in response to the fourth hash and the appended hash not matching:
  generate a second type error message that indicates detection of tampering with the new image; and
  store the second type error message to an error log.

18. The validation system of claim 17, wherein the firmware further configures the controller to:
in response to the update hash and the appended hash matching:
  store the remaining new image to the first memory device.

19. A method for provisioning a new image of an information handling system (IHS), the method comprising:
receiving a third image that comprises an original set of data including a first data string of pre-determined data located at a reserved address of the third image corresponding to a first location, the third image further comprising at least one other data string;
calculating a third hash of the third image;
generating a fourth image by replacing the first data string of pre-determined data within the third image with the third hash inserted into a location of the reserve address, such that the third hash is embedded in the fourth image;
calculating an appended hash of the fourth image;
appending the appended hash to the fourth image to generate a modified fourth image; and
storing, to the first memory device as a new image, the modified fourth image containing the embedded third hash and the appended hash appended thereto, wherein the new image is authenticated at the information handling system utilizing the appended hash.

20. The method of claim 19, wherein the method is performed by a factory IHS.

* * * * *